UNITED STATES PATENT OFFICE.

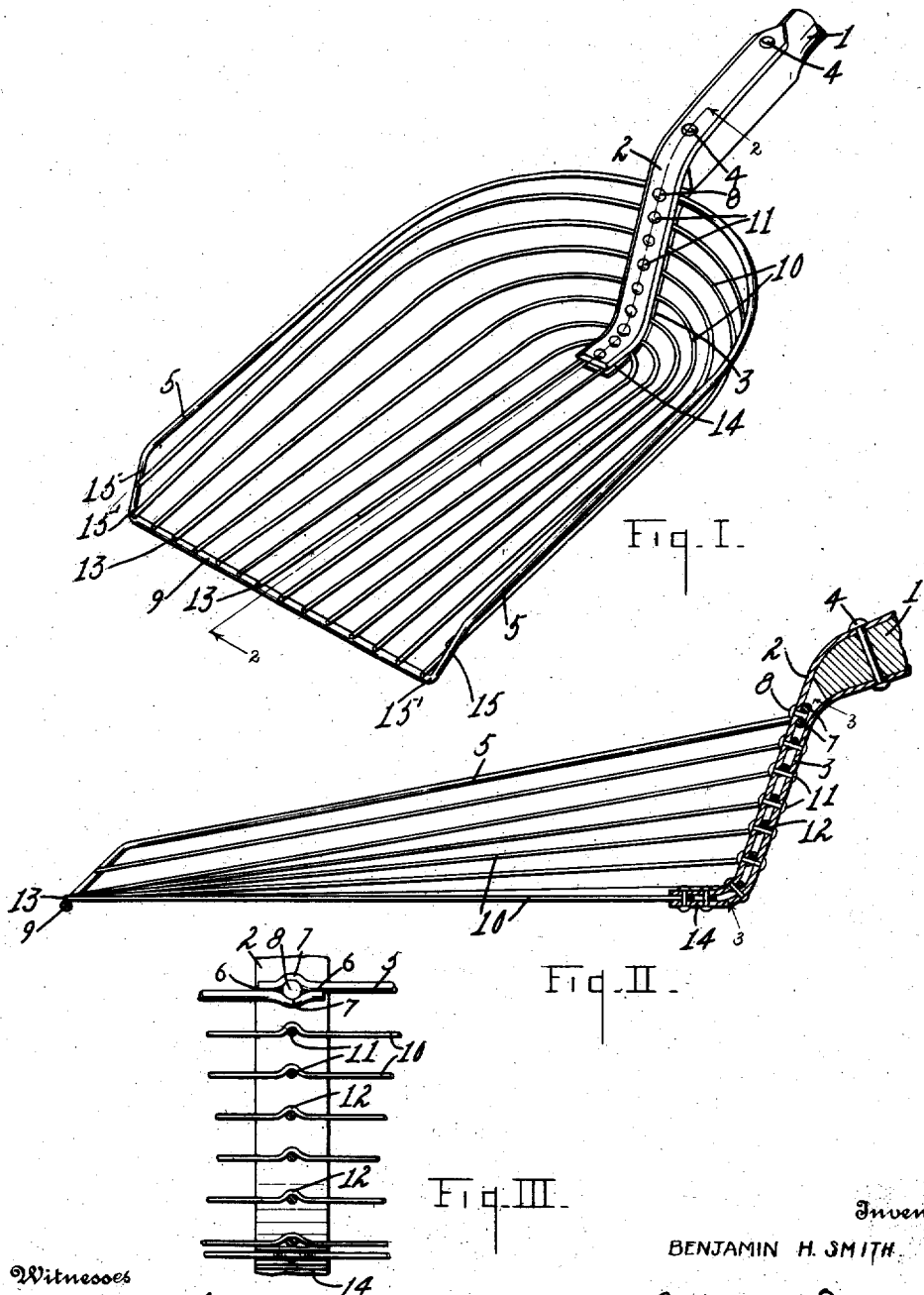

BENJAMIN H. SMITH, OF NILES, MICHIGAN, ASSIGNOR TO MICHIGAN WIRE GOODS CO., OF NILES, MICHIGAN.

SIFTING-SHOVEL.

1,257,415.      Specification of Letters Patent.      Patented Feb. 26, 1918.

Application filed December 3, 1917. Serial No. 205,091.

*To all whom it may concern:*

Be it known that I, BENJAMIN H. SMITH, a citizen of the United States, residing at Niles, county of Berrien, State of Michigan, have invented certain new and useful Improvements in Sifting-Shovels, of which the following is a specification.

This invention relates to improvements in sifting shovels.

The main objects of my invention are:

First, to provide an improved sifting shovel formed mainly of wire which is very strong and rigid and durable.

Second, to provide a shovel having these advantages which is simple and economical in structure.

Further objects, and objects relating to structural details, will definitely appear from the detailed description to follow.

A structure which is a preferred embodiment of my invention is clearly illustrated in the accompanying drawing, forming a part of this specification, in which:

Figure I is a perspective view of my improved shovel, the handle being broken away.

Fig. II is a detail longitudinal section on a line corresponding to line 2—2 of Fig. I.

Fig. III is a detail section on a line corresponding to line 3—3 of Fig. II.

In the drawing similar reference characters refer to similar parts throughout the several views, and the sectional views are taken looking in the direction of the little arrows at the ends of the section lines.

Referring to the drawing, the handle 1 is, in the structure illustrated, formed of wood. The shank is formed of a pair of strap-like members 2 and 3, the upper ends of which are lapped on the top and bottom of the handle, and secured thereto by the through rivets 4.

I provide a border frame member 5 formed of quite heavy gage wire looped or bent upon itself with its ends overlapped and welded together at 6 and having opposed offsets 7 therein forming an eye for the rivet 8 by means of which the border frame member is secured to the shank. The bight end of the border frame member is offset downwardly forming the front cross piece 9 of the shovel.

I provide a series of U-shaped bar members 10 formed of wire and of graduated or varying sizes arranged within the frame member and one within another in spaced relation, the bight portion of the members being arranged between the shank members which are clamped thereon by means of the rivets 11. The bar members have offsets 12 engaging these rivets so that lateral movement of the bar members is effectively prevented.

The front ends of the bar members are arranged upon and secured to the front cross bar 9 by spot welding at 13. The lower ends of the shank members project forwardly at 14 providing a heel for the shovel.

The outer bar member 10 is arranged with its front ends secured to the upright portions 15 of the frame member, while the adjacent frame member is arranged with its front portion secured in the angles 15', as illustrated.

With the parts thus arranged, I provide a shovel which is very strong and rigid and at the same time one which is simple and economical to produce and light in weight. The shovel illustrated is especially designed by me for use in sifting ashes for which it is very desirable, as there are no points which are likely to become clogged or retain coals or the like. It is, of course, adapted for a great variety of uses.

Having thus described my invention, what I claim as new and desire to secure by Letters Patent, is:

1. In a sifting shovel, the combination with a handle, of a pair of downwardly projecting shank members secured to said handle and terminating in a forwardly projecting heel portion, a border frame member bent upon itself with its bight portion offset downwardly and constituting a front cross bar and having its ends lapped and welded together and having opposed offsets therein constituting an eye, said eye being disposed between the shank members and secured by a rivet, U-shaped bar members arranged within said frame member and one within another in spaced relation with their bights disposed between said shank members and having rivet engaging offsets therein, the ends of said bar members being arranged upon and welded to the said offset front bar portion of said frame member, and rivets clamping said shank members upon said bar member engaging said offsets therein.

2. In a sifting shovel, the combination with a handle, of a pair of downwardly projecting shank members secured to said handle, a border frame member bent upon itself with its bight portion constituting a front cross bar and having its ends lapped and welded together and having opposed offsets therein constituting an eye, said eye being disposed between the shank members and secured by a rivet, U-shaped bar members arranged within said frame member and one within another in spaced relation with their bights disposed between said shank members and having rivet engaging offsets therein, the ends of said bar members being arranged upon and welded to the said front bar portion of said frame member, and rivets clamping said shank members upon said bar member engaging said offsets therein.

3. In a sifting shovel, the combination with a handle, of a pair of downwardly projecting shank members secured to said handle, a border frame member bent upon itself with its bight portion offset downwardly and constituting a front cross bar and its ends secured to the shank, U-shaped bar members arranged within said frame member and one within another in spaced relation with their bights clamped between said shank members and having rivet engaging offsets therein, the ends of said bar members being arranged upon and welded to the said offset front bar portion of said frame member, and rivets clamping said shank members upon said bar member engaging said offsets therein.

4. In a sifting shovel, the combination with a handle, of a pair of downwardly projecting shank members secured to said handle and terminating in a forwardly projecting heel portion, a border frame member bent upon itself with its bight portion offset downwardly and constituting a front cross bar and its ends lapped and welded together and having opposed offsets therein constituting an eye, said eye being disposed between the shank members and secured by a rivet, U-shaped bar members arranged within said frame member and one within another in spaced relation with their bights clamped between said shank members, the ends of said bar members being arranged upon and welded to the said offset front bar portion of said frame member.

5. In a sifting shovel, the combination with a handle, of a pair of downwardly projecting shank members secured to said handle, a border frame member bent upon itself with its bight portion constituting a front cross bar and its ends lapped and welded together and having opposed offsets therein constituting an eye, said eye being disposed between the shank member and secured by a rivet, U-shaped bar members arranged within said frame member and one within another in spaced relation with their bights clamped between said shank members, the ends of said bar members being arranged upon and welded to the said front bar portion of said frame member.

In witness whereof, I have hereunto set my hand and seal in the presence of two witnesses.

BENJAMIN H. SMITH. [L. S.]

Witnesses:
O. W. COOLIDGE,
CHAS. E. WHITE.